United States Patent [19]

Herrington

[11] Patent Number: 4,654,180
[45] Date of Patent: Mar. 31, 1987

[54] INTERMITTENTLY STRETCHING THERMOPLASTIC WITH NIP ROLLS

[75] Inventor: Fox J. Herrington, Holcomb, N.Y.

[73] Assignee: Mobil Oil Corporation, New York, N.Y.

[21] Appl. No.: 789,241

[22] Filed: Oct. 18, 1985

[51] Int. Cl.$^4$ ............................ D02J 1/06; B31B 23/64
[52] U.S. Cl. ......................... 264/288.8; 264/DIG. 73; 26/71; 493/211; 493/225; 493/338; 493/461; 493/928
[58] Field of Search ............... 493/480, 339, 338, 225, 493/211, 460, 461, 928, 962; 264/167, 288.8, 291, 280, 73, 164, 288.4, DIG. 28, DIG. 73; 425/363, 383, 445, DIG. 17, 66, 76, 367, 384, DIG. 53, DIG. 236; 26/71; 28/243

[56] References Cited

U.S. PATENT DOCUMENTS

| | | | |
|---|---|---|---|
| 1,125,363 | 8/1968 | Jortikka | 226/107 |
| 1,878,085 | 2/1933 | Dreyfus et al. | 264/167 |
| 1,920,824 | 8/1933 | West | 493/225 |
| 2,038,722 | 4/1936 | Dreyfus et al. | 264/167 |
| 2,296,394 | 9/1942 | Meloon | 425/DIG. 17 |
| 2,341,823 | 2/1944 | Smith | 425/DIG. 17 |
| 2,545,868 | 3/1951 | Bailey | 425/DIG. 53 |
| 3,029,853 | 4/1962 | Piazze | 383/75 |
| 3,084,731 | 4/1963 | Kugler | 493/225 |
| 3,539,680 | 11/1970 | Fukushima et al. | 264/288.8 |

FOREIGN PATENT DOCUMENTS 885513 12/1961 United Kingdom ....... 425/DIG. 17

Primary Examiner—Frederick R. Schmidt
Assistant Examiner—William E. Terreu
Attorney, Agent, or Firm—Alexander J. McKillop; Michael G. Gilman; Charles J. Speciale

[57] ABSTRACT

A draw tape for thermoplastic bags is made by feeding tape to a first pair of nip rolls rotating at a relatively slow speed and a second pair rotating at a fast speed. The tape is stretched to form thin and narrow central portions between end portions of unstretched tape. The first nip rolls are increased in speed, or are released to interrupt the stretching. When the rolls are closed, one of them is momentarily retarded or backed up, to produce a rapid transition in the tape between the unstretched end portion and the stretched central portion.

4 Claims, 7 Drawing Figures

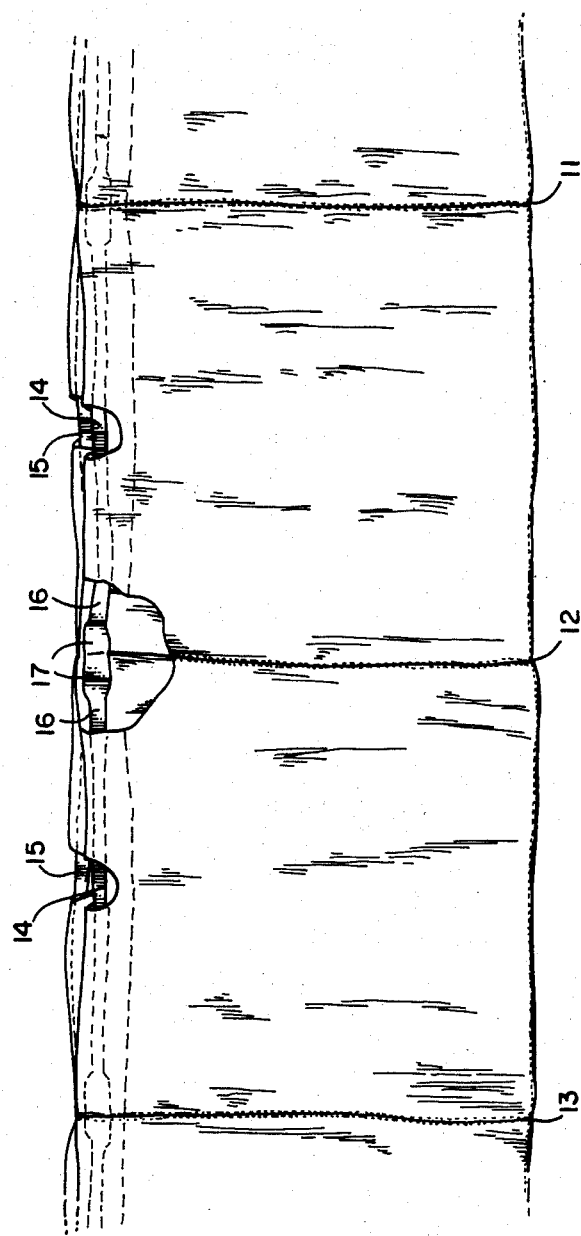

INTERMITTENTLY STRETCHING THERMOPLASTIC WITH NIP ROLLS

BACKGROUND OF THE INVENTION

This invention relates to the manufacture of draw tape for thermoplastic bags, and more particularly, to making an intermittently stretched and oriented draw tape.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Pat. No. 1,125,363—Jortikka are examples of draw tape bags. Such closures have been successfully employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

As more fully set forth in the Herrington application identified below, an improved draw tape for trash bags of this type has a stretched relatively thin central portion between unstretched, relatively thick and wide end portions of the tape. The end portions are heat sealed at the sides of the bag. This stretched tape has an economic advantage and improved load carrying characteristics.

It is an object of the present invention to provide a method of and apparatus for intermittently stretching thermoplastic tape to produce such draw tapes for bags.

It is another object of the present invention to provide tape stretching apparatus with mechanical simplicity and no reciprocating parts.

RELATED APPLICATIONS

"METHOD & APPARATUS FOR MANUFACTURING DRAW TAPE BAGS", Boyd, et al, Serial No. 652,254, filed Sept. 20, 1984, pending describes an overall draw tape bag manufacturing line; "METHOD & APPARATUS FOR FORMING HEMS IN SUPERPOSED PLIABLE PANELS", Boyd et al, Ser. No. 652,255, filed Sept. 20, 1984, now U.S. Pat. No. 4,617,008, describes a hem forming apparatus used with the line; "INSERTION OF DRAW TAPE STRIPS IN DRAW TAPE BAG MANUFACTURE", Boyd, et al, Serial No. 652,252 filed Sept. 20, 1984, now U.S. Pat. No. 4,597,750 describes the apparatus for inserting the draw tape into the bag. "BAG HAVING INTERMITTENT ORIENTATION DRAW TAPE", Herrington, Ser. No. 722,045, filed Apr. 11, 1985, pending describes an intermittently oriented draw tape. The foregoing applications are incorporated herein by reference.

SUMMARY OF THE INVENTION

In accordance with the present invention, thermoplastic tape is intermittently stretched and oriented by a first pair of nip rolls running at a relatively slow speed and a second pair of nip rolls running at a higher speed. Thermoplastic tape is fed between the two pairs of nip rolls to stretch it to produce relatively thin and narrow central portions. The stretching is intermittently stopped to produce thick and wide end portions. Stretching is stopped by intermittently speeding up the first pair of nip rolls, or by intermittently opening the nip rolls. In accordance with the invention, a good sharp transition between the thick and wide end portion and the thin and narrow central portion is obtained by further slowing the speed of one of the first pair of nip rolls, or by backing it up after the nip rolls are closed.

The draw tape produced in this manner is inserted into the hem of the bag and the thick and wide portions of the tape are heat sealed at the sides of each bag. In this manner, stretched, oriented tape forms the bag carrying handle, but the tape is heat sealed in unstretched, unoriented portions of the tape. The apparatus of the present invention is easily synchronized with the bag making apparatus which includes means for slitting a tube of extruded polyethylene, forming a hem in the continuous length of film, inserting the draw tape into the hem, heat sealing the tape in the sides of the bag and severing the continuous length of film into individual bags. The present invention has the advantages of simplicity and small size.

The foregoing and other objects, features and advantages of the invention will be better understood from the following more detailed description and appended claims.

SHORT DESCRIPTION OF THE DRAWINGS

FIGS. 1 and 1A show a series of bags with the draw tape made in accordance with the present invention;

DESCRIPTION OF THE PREFERRED EMBODIMENT

Figure 1A:
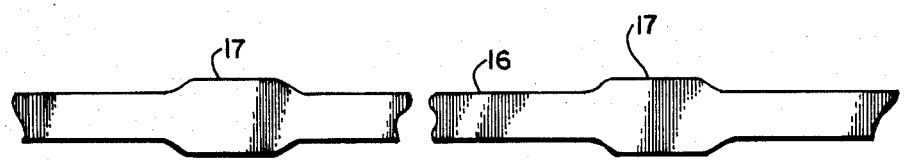

FIGS. 1 and 1A show bags for carrying trash and the draw tape for them. They include two panels which are formed from an extruded tube of polyethylene. The sides of the panels are heat sealed and cut from the tube in a perpendicular direction at 11, 12 and 13. The tube is slit along one side to form open tops in the bag for reception of trash and the like. Hem portions of each panel are folded over adjacent the top. Draw tapes 14 and 15 are secured by the heat seal at the sides of the panels. A cut-out in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

The draw tape has a relatively thin and narrow central portion 16 of stretched, oriented, polyethylene and end portions 17 at the extremities. The relatively thick and wide end portions are unstretched, unoriented, polyethylene tape. The heat seal which secures the draw tape to the sides of the panels is through the relatively thick and wide end portions.

Figure 2:
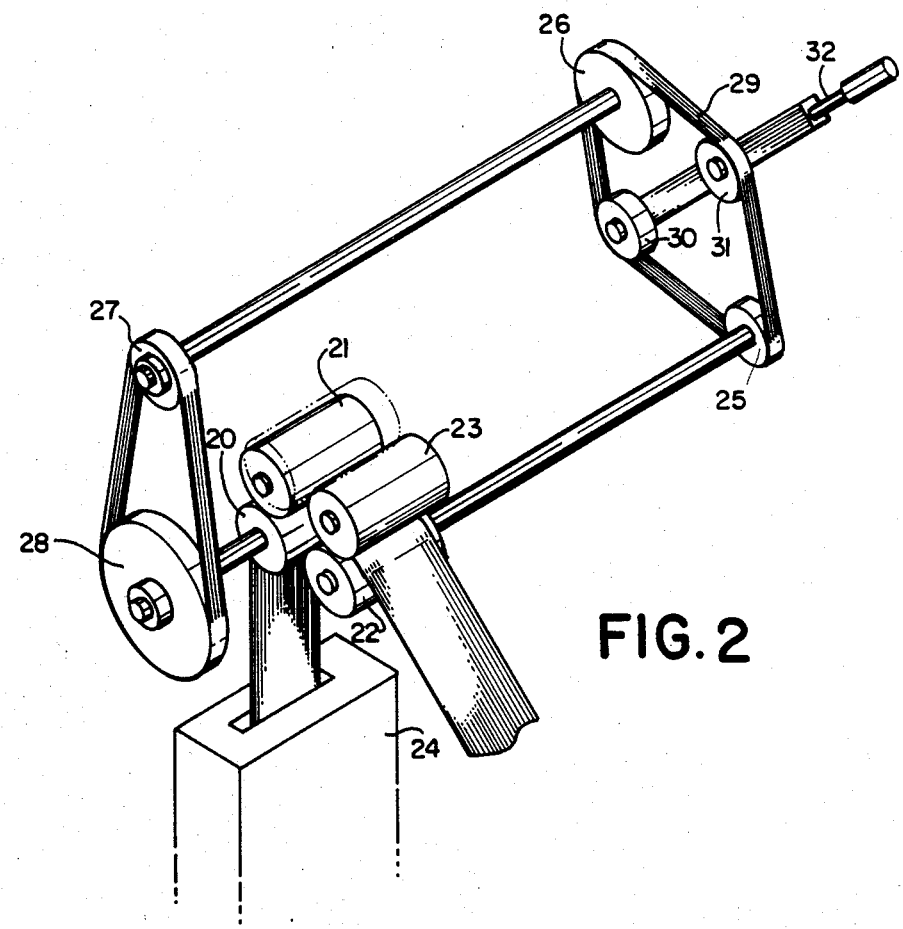
FIG. 2 shows the apparatus of the present invention.

FIG. 2 shows apparatus for producing this type of draw tape. It includes a first pair of nip rolls 20 and 21 running at a relatively slow speed and a second pair of nip rolls 22 and 23 running at a higher speed.

Thermoplastic tape is fed from the oven 24 to the different speed nip rolls to stretch the tape to produce the relatively thin and narrow central portions. The tape should be heated prior to entering the stretching apparatus in order to avoid line-drawing and obtain smooth orientation. The slow nip roll 20 should also be heated to avoid cooling of the tape prior to stretching.

The stretching is intermittently stopped to produce the thick and narrow end portions in the tape. This can be accomplished by momentarily speeding up the first pair of nip rolls 20 and 21. As shown in FIG. 2, stretching is stopped by intermittently releasing the nip roll 21 to its broken line position. Then, the roll 21 is closed to begin stretching again.

The first and second sets of nip rolls should be as close together as practical in order to achieve sharp definition of changes in orientation. Therefore, they should be small in diameter. When the slow roll 21 first opens, the stretching is sharply interrupted. However, after the nip rolls close, some travel is required before the stretching reaches its equilibrium again, and this can result in a slow transition back to the oriented state. To minimize this problem, the slow roll 20 should be backed up or at least slowed down slower than normal, after closure of the roll 21. In order to accomplish this, the shuttle and belt drive shown in FIG. 2 is provided. It includes a constant speed driven pulley 25 driven at the same speed as the fast roll 22. A variable speed pulley 26 is connected through pulleys 27 and 28, and associated shafts and belts, to the slow nip roll 20. A timing belt 29 interconnects the constant speed pulley 25 and the variable speed pulley 26.

A shuttle includes two idler pulleys 30 and 31 which are moved by the cylinder 32. While rolls 20 and 21 are open, or speeding up, the shuttle is moved to one position. In this position of the shuttle, upwardly and to the right, the belt 29 is lengthened on the right side of pulley 26 and shortened on the left side. The timing belt 29 drives variable speed pulley 26 in the clockwise direction to advance the slow roll 20. After the slow rolls 20 and 21 are closed, the shuttle is moved to its other position, downwardly and the left. This lengthens the belt on the left side of the pulley 26 and shortens it on the right side. Pulley 26 momentarily slows its rotation, or rotates counter-clockwise, thereby retarding the rotation of slow roll 20, or backing it up. In this manner, a rapid transition between the unstretched end portion and the stretched central portion is achieved.

Figure 3A:
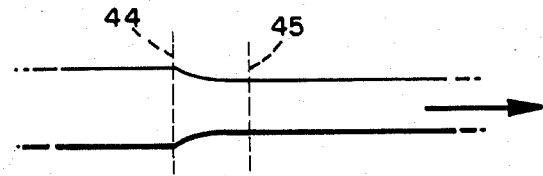
FIGS. 3A–3C depict tape as it is stretched by the nip rolls.
Figure 3B:
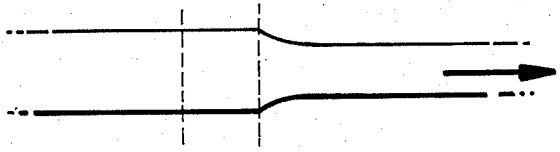
Figure 3C:
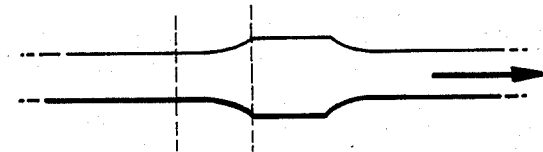

This is best illustrated in FIGS. 3A–3C where the dashed lines 44 and 45 represent the nip points of the slow and fast nip rolls. In FIG. 3A, the slow roll 21 is opened, resulting in a rapid transition from the stretched to the unstretched portion of the tape. FIG. 3B depicts the position of the tape when the slow roll 21 is closed again. By retarding, or backing up, the slow roll 20, a rapid transition from unstretched to stretched tape is achieved as shown in FIG. 3C.

As an example of the operation, consider the production of draw tape for a 30" wide bag. This tape will have approximately 28" long central portions with 2" long end portions. In this example, the slow nip rolls run at a surface speed of 60 ft. per minute, and the fast nip rolls at 300 ft. per minute to produce a stretch ratio of approximately 5:1. With the tape running at 300 ft. per minute during stretching, the slow rolls 20 and 21 are open for approximately 1/30 of a second to produce the 2" unstretched end portions. With the 2" spacing between the rolls, the tape is exposed to stretching for a very short time, about 1/30 of a second. With some tape, breakage may be encountered with this rapid stretching so it will be necessary to lengthen the spacing between the rolls and use a different stretch ratio. As the spacing between the slow and fast rolls is increased, the need for retarding or backing up the slow roll after closure becomes increasingly important.

Figure 4:
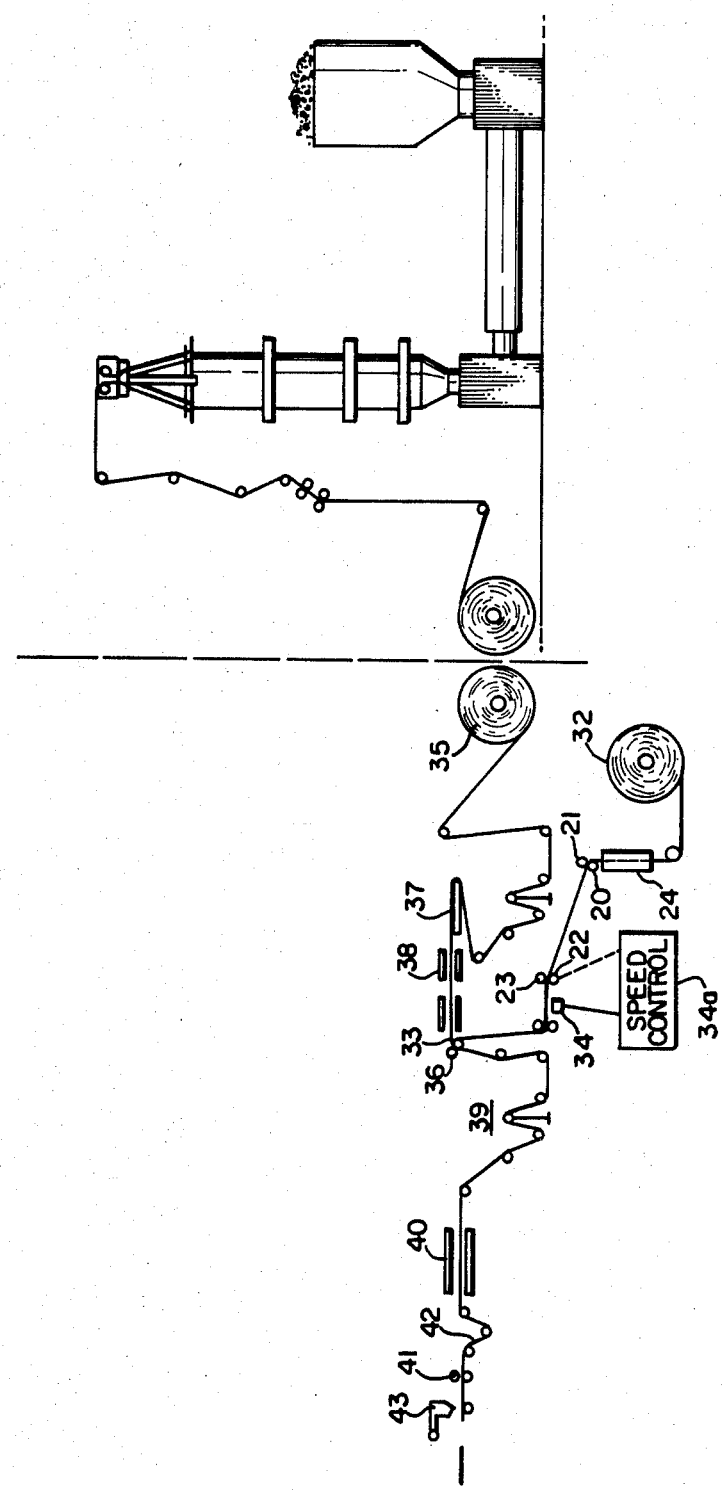
FIG. 4 depicts a manufacturing line for the bags which includes the apparatus of the present invention for intermittently stretching the draw tape prior to insertion into the bags.

FIG. 4 shows the apparatus of the present invention with bag making machinery. Polyethylene tape from the roll 32 is intermittently stretched by the first pair of nip rolls 20 and 21 and the second pair of nip rolls 22 and 23.

The stretched tape is fed into the tape inserter 33, where it is inserted into the hem of a continuously moving line of bags. In order to operate the tape stretching apparatus of the present invention in line with this bag making apparatus, it is necessary to synchronize the tape stretcher with the bag machine in two respects:

1. Cyclic register: There must be exactly one end portion for every cycle of the bag machine. This can be done by triggering the opening and closing of the slow nip rolls from the crank in the bag machine which advances the bags.

2. Linear speed match: The linear speed of the exiting oriented tape must be the same as the speed of the film entering the bag machine, in order to match tensions. This can easily be accomplished by driving the fast roll at the required speed, determined by sensing the tension of the tape between the orienter and the bag machine with the sensor 34. Speed control 34a adjusts the speed of fast roll 22.

The remainder of the line for producing draw tape bags shown in FIG. 4 is more fully described in the aforementioned applications. Briefly, a roll 35 feeds a continuous, extruded tube of polyethylene which has been slit and folded along a median longitudinal line. The material is drawn from the roll 35 by pinch rollers 36. These draw the folded film, forming the two opposing panels, through a hemmer 37 and through a punch 38 which forms the cut-outs in each panel. The continuous line of bags passes through the tape inserter 33 where the draw tape from the stretching apparatus of the present invention is inserted into each hem of the bag.

The continuous length of film with the draw tapes inserted in the hem thereof is advanced from the pinch rollers 36, through rollers 39 and a hem sealer 40, by means of a second pair of pinch rollers 41. As the length of continuous hem sealed film exits the hem sealer 40, it passes through a set of dancer rolls 42, to the seal cutter assembly 43. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. Apparatus for forming a thermoplastic draw tape having thick and wide end portions with a relatively thin narrow central portion between said end portions comprising:

feed means for feeding a continuous thermoplastic tape;

a first pair of nip rolls arranged for engaging a tape from said feed means and running at a relatively slow tape propelling speed;

a second pair of nip rolls arranged for engaging a tape from said first pair of nip rolls and running at a higher tape propelling speed to stretch with the first pair of nip rolls a tape simultaneously engaged by said two pairs of nip rolls; and means controlling the operation of at least one of said first and second pair of nip rolls for intermittently varying the operation of said controlled pair of nip rolls to stop stretching of a tape between said pairs of running nip rolls including means for intermittently releasing said first pair of nip rolls from the film to produce and end portion and thereafter closing the first pair of nip rolls on the film; and means for normally momentarily decreasing the speed of one of said first air of nip rolls after the one pair of nip rolls are closed to quickly stretch the fed tape engaged by said two pairs of nip rolls in a rapid transition from the end portion to said central portion.

2. The apparatus recited in claim 1 wherein said means for momentarily decreasing the speed of one of said nip rolls comprises:

a constant-speed driven pulley;

a variable-speed pulley connected to said one nip roll;

a timing belt interconnecting said constant speed pulley and said variable speed pulley; and a shuttle movable between one position in which said timing belt drives said variable speed pulley to advance said one nip roll and another position in which the rotation of said variable speed pulley is momentarily reversed to retard said one nip roll.

3. The apparatus recited in claim 2 wherein said shuttle includes two idler pulleys engaging said timing belt between said constant speed pulley and said variable speed pulley so that movement of said shuttle in one direction shortens said belt on one side and lengthens it on the other side of said variable speed pulley and movement in the opposite direction lengthens said belt on said one side and shortens it on said other side of said variable speed pulley.

4. A method of forming thermoplastic draw tape having thick and wide end portions with a relatively thin and narrow central portion between the end portions from a preformed unstretched, unoriented thermoplastic tape comprising:

running a first pair of nip rolls at a relatively slow tape propelling speed;

running a second pair of nip rolls at a higher tape propelling speed;

stretching said preformed unstretched, unoriented thermoplastic tape between said first and second pair of nip rolls and thereby producing said thin and narrow central portions;

intermittently stopping said stretching by varying one of said running steps to produce said end portions by intermittently releasing said first pair of nip rolls to produce an end portion and thereafter closing said first pair of nip rolls; and momentarily decreasing the speed of one of said first pair of nip rolls after closing to quickly stretch said fed tape in a rapid transition from the end portion to said central portion.

* * * * *